350-377 SR

XR 3,899,780

TK4030N

United Sta

Otala

[11] 3,899,780

[45] Aug. 12, 1975

[54] MAGNETIC BUBBLE STORE HAVING OPTICAL CENTERING APPARATUS

[75] Inventor: Matti Niilo Tapani Otala, Oulu, Finland

[73] Assignee: U.S. Philips Corporation, New York, N.Y.

[22] Filed: Jan. 30, 1974

[21] Appl. No.: 437,975

[30] Foreign Application Priority Data

Feb. 12, 1973 Netherlands ...................... 7301929

[52] U.S. Cl. ..... 340/174 YC; 340/174 TF; 350/151

[51] Int. Cl.[2] .................. G11C 13/06; G11C 11/14

[58] Field of Search ............... 340/174 TF, 174 YC; 350/151; 179/100.3 V

[56] References Cited

UNITED STATES PATENTS

| | | | |
|---|---|---|---|
| 3,631,415 | 12/1971 | Aagard et al. | 340/174 YC |
| 3,731,290 | 5/1973 | Aagard | 340/174 YC |
| 3,742,471 | 6/1973 | Mikami | 340/174 YC |
| 3,810,131 | 5/1974 | Ashkin et al. | 340/174 YC |

*Primary Examiner*—Stanley M. Urynowicz, Jr.
*Attorney, Agent, or Firm*—Frank R. Trifari; Simon L. Cohen

[57] ABSTRACT

A storage system comprising a plate of magnetic material with a two-dimensional regular array of positions. A domain can be written and read in each of said positions by means of electromagnetic radiation. The electromagnetic radiation is generated by a highly coherent light source which can be modulated, for example, a laser. If they are not to be rased, the domains are maintained under the influence of a constant magnetic field which is generated by a permanent magnetic layer. Written domains are fixed to one of said positions in that the plate of magnetic material locally comprises a recess.

5 Claims, 7 Drawing Figures

3899780
OR IN 365/10

MAGNETIC BUBBLE STORE HAVING OPTICAL CENTERING APPARATUS

The invention relates to a storage system, comprising a plate of magnetic material in which digital information can be stored in the form of domains, under the influence of the thermal action of electromagnetic radiation which is transported by write means, in a number of positions which are determined by magnetically active elements, furthermore comprising means for maintaining a magnetic bias field, the magnitude of said field determining the domain dimensions, and furthermore comprising read means.

A storage system of this kind is described in the previous U.S. Patent application Ser. No. 340,229, filed Mar. 12, 1973, and now U.S. Pat. No. 3,824,570 in the name of Applicant. This Application concerns a device for converting image information into magnetic information which is incorporated in a domain pattern. The information is subsequently applied to an output in series form. In this context, domain is to be understood to mean a so-termed magnetic bubble, which is an area in the plate which has a magnetization direction which, when a magnetic field is applied transverse to the plate, is opposed to that of the magnetic field. Its shape may be that of a disc, a ring, a strip or a halter. Domains of this kind are very suitable for the storage of digital information, inter alia because at a given shape, its dimensions are dependent only of the magnetic bias field and of the material parameters. As a result, the requirements imposed as regards the write means and read means and also as regards the constancy of the magnetic bias field are low. Suitable materials are the garnets and orthoferrites. According to U.S. Pat. No. 3,824,570, reading is time consuming, even if only a part of the information is used. An additional drawback of such plates is the fact that during the manufacturing process contaminations are introduced in the plate material. It is difficult or even impossible to move domains past such a location. The drawbacks are eliminated according to the invention which is characterized in that said magnetically active elements comprise first recesses which are provided in the plate of magnetic material, with the result that a regular two-dimensional array is formed. The write means, and also the read means which are capable of transporting electromagnetic radiation as the read medium, comprise positioning members by means of which one of said positions is selectively addressable. Part of the information can thus be quickly read each time because the read means are selectively positioned on a position. The same applies to the storage of information. Because the domains do not move in the plate, they are not obstructed by contaminents. A contamination can render one of the predetermined positions unusable, but counter-measures known to be used in digital stores are available. Because the plates of magnetic material are allowed to contain contaminents, they will be less costly as a result of the higher manufacturing yield.

Because, in addition, the positioning means are used for storage as well as reading, a simple configuration is obtained.

The storage of selectively readable information in tapes and plates of magnetic materials is known. This does not concern the already said "magnetic bubbles," so that the achievable information density is much lower than that according to the invention. Furthermore, it is known to store analog information by way of the dimensions of magnetized regions. It will be obvious that for each information element a space of variable size is then required, which constitutes a drawback. By utilizing fixed positions according to the invention for digital storage, a large number of advantages is combined such as high information density, quick access for reading, and an intrinsically small susceptibility to disturbances. Further advantages are higher manufacturing yield and low energy consumption during reading and writing (will be discussed hereinafter). According to U.S. Pat. No. 3,824,570, the positions are realized as elements of a domain displacement structure, for example, a vapourdeposited permalloy T-bar pattern. A pattern of this kind requires substantial space. The first recesses enable a high information density, because they need not be large with respect to the domain diameter; this is in contrast with the T-bars. Furthermore, they can be readily provided and involve little interference with write and read means.

A further advantage yet is that the location of the information is known in advance. With previous methods, such as magnetic tapes, previous information must be read in order to know the location of later information. All sorts of aids are used for this purpose, for example, self-synchronizing codes.

It is an advantageous aspect that the plate of magnetic material comprises second recesses which constitute a regular two-dimensional array in conjunction with said first recesses, and that optical centering means are provided by means of which radiation can be projected on the plate of magnetic material and can be detected after reflection, it being possible for said centering means to cooperate in a centering manner with said second recesses. The first and second recesses can be proportioned so as to be optimum for their specific application. The construction of such centering means in a control loop is simple.

It is a further advantageous aspect of the invention that drive means are provided by means of which said plate, arranged on a disk, can be rotated at a substantially uniform speed, the recesses being arranged according to at least substantially circular tracks. A storage disk is thus obtained; such a disk-like configuration is very advantages in computers, although it has substantially lower information density. With respect to a known storage disk in which the information is contained in a fixed pattern of recesses in the non-magnetizable surface, the invention offers the possibility of writing information in a reversible manner. Fast reading of a part of the information is effected by radial positioning of the read means during rotation of the disk. The movement is relative: the disk can be stationary and the storage/read means can rotate.

It is further advantageous aspect that first and second recesses coincide. In this manner an even more compact storage is obtained because the space of the second recesses is also utilized.

A further advantageous aspect yet of the invention is that additional information is contained in a dimension of the second recesses. For example, the different tracks can thus be readily identified.

Another advantageous aspect of the invention is that said means for maintaining a magnetic bias field contain a layer of permanent magnetic material which is provided on the plate of magnetic material. The advantages thereof will yet be described.

The invention will be described in detail with reference to some figures.

FIG. 1 shows a first embodiment of a storage system according to the invention, comprising a signal input A, a control unit CONTR, a light source LASER, a light beam deflector POS, four lenses LA, LB, LC, LD, a plate of magnetic material P, an analyzer plate ANAL, a detector unit DET, two magnet coils COI, and a signal output B.

The read procedure will first be described. The signal input A receives address information and clock information for this purpose. The address information specifies a given position (or a number of positions) on the plate P; the address information signals are applied to the light beam deflector POS; thereby, a light beam can be digitally deflected over a predetermined angle and azimuth, so that a position on the plate P is indicated: lenses LC and LA deflect the light beam to this position. The light source LASER and the detector unit DET receive clock pulse information from the control unit CONTR. As a result, synchronous detection takes place: the light source LASER transmits a short pulse of linearly polarized light. The plate P is situated in the magnetic bias field which is generated by the magnet coils COI. This magnetic field is sufficiently uniform. It is of course alternatively possible to generate this field by means of a permanent magnet, the poles thereof being provided with a hole for allowing passage of light. The polarization plane of the light rotates in plate P in accordance with the presence or absence of a domain in the irradiated position. The directions of the Faraday rotation are thus opposed. The lenses LD and LB deflect the transmitted light to the analyzer plate ANAL. This plate allows substantially complete passage of light of a given polarization direction, and substantially completely blocks light having a polarization direction which is perpendicular thereto. These directions are chosen such with respect to the polarization direction of the light of the light source LASER that sufficient contrast appears between the transmitted light quantities upon passage along a point where a domain is present and a point where the domain is absent. The unit DET can comprise a level separator whereby a binary 0-signal or 1-signal can be generated: this signal appears on the signal output B. Because the stored information is digital, a given interval always remains available for the signal amplitude to be detected by the detector DET as a 1 or a 0. Consequently, for example, a given tolerance in the light yield is permissible for the light source LASER. The same applies to the other parts of the storage system.

Figure 1:
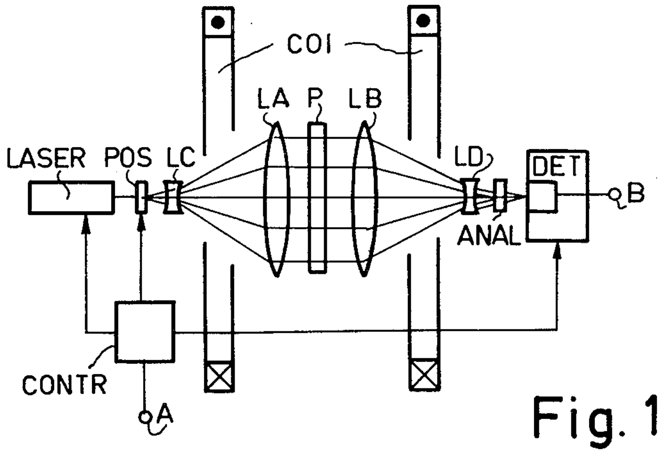
FIG. 1 shows a storage system according to the invention.

With the exception of the plate P, all elements of the storage system of FIG. 1 are well known. Therefore, these elements need not be elaborated upon in this context. The information write procedure will be described later.

Figure 2:
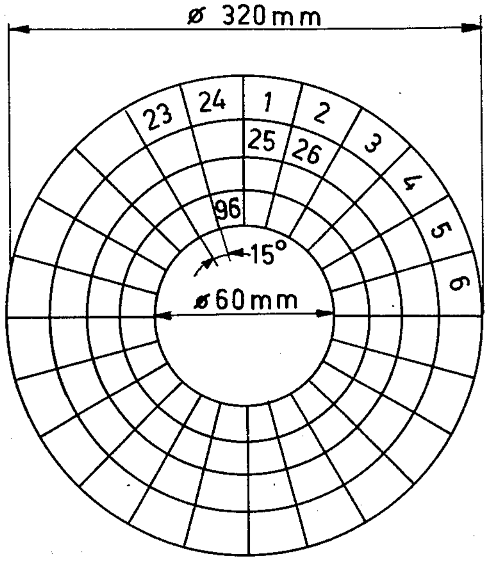
FIG. 2 shows an organization of a storage disk.

FIG. 2 shows an organization of a storage disk for use in a storage system according to the invention. The disk comprises a number of plates of magnetic material 1, 2, . . . 96 in which domains can be formed. It was found to be simpler to manufacture small plates of magnetic material and to arrange these on a carrier disk. It is advantageous if the boundaries between adjoining plates always lie at the same angle and radii: these locations can be stored as being non-addressable in a special control store. The number of plates and the dimensions of the disk are given merely by way of example. The disk is rotated in a storage system according to the invention at a uniform speed, step-wise positioning taking place in the radial direction. In the center of the disk mechanical centering means can be provided, for example, a central hole or a central pin.

The bias field can be generated by a permanent magnet or a coil, but also by a deposited permanent magnetic layer. If the plate is removable, the low weight is advantageous. If the plate rotates in the storage system, there will be no additional balancing problems. Furthermore, the direction of the bias field is then always exactly the same. Finally, a very homogeneous bias field can thus be realized. Such a layer of permanent magnetic material is known from the article "Thin-film Surface Bias on magnetic Bubble Materials," by T. W. Liu et al, J. Appl. Phys. 42 (1971) 1360. The relevant layer consisted of vapourdeposited material. It was found that the externally generated bias field, for example by means of a coil, can be reduced by 69 percent by means of a suitable layer. This experiment concerned moving domains where, as described, the requirements are higher. Further improvements can be achieved by improved adhesion of the vapor-deposited layer to the plate of magnetic material or suitable materials. In the experiment the collapse fields amounted to 38 and 15 Oersted, respectively, and the operating fields to 35 and 11 Oersted, respectively. Near the operating field strength the domains are properly shaped. If the field is too high, implosion occurs while a run-out field is obtained when the field is too low.

Figure 3:
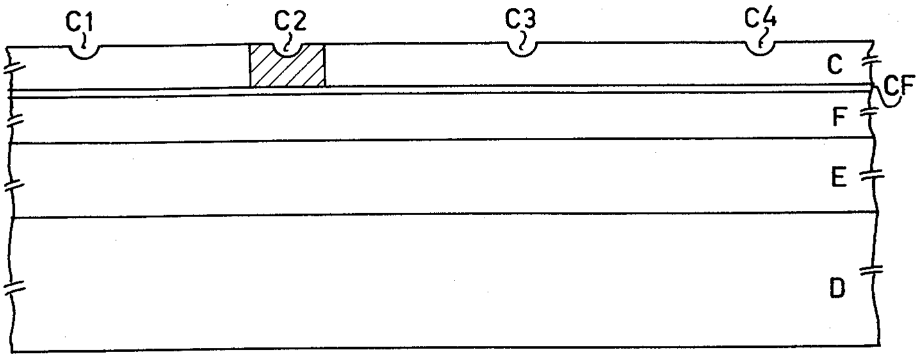
FIG. 3 is a cross-sectional view through a storage disk according to FIG. 2.

In another article, "Cylindrical Magnetic Domain Propagation in $Sm_{0.55}Tb_{0.45}FeO_3$ Platelets Possessing High Surface Coercitivity" by P. P. Luff and L. M. Lucas, J. Appl. Phys. 42 (1971) 5173, it is described that the layer can be generated by a given method of polishing. The two described methods can be combined. It is to be emphasized that in such configurations the bias field does not substantially extend outside the plate of magnetic material/additional layer. Even if the magnetic field generated by a permanent magnetic layer should not be completely adequate to maintain the domains, it is still advantageous because much lower requirements can then be imposed as regards the uniformity of an additional external field. FIG. 3 is a sectional view (not to scale) through a storage disk as shown in FIG. 2, comprising a support layer D having a thickness of 2–5 mm for reinforcement. This layer is made, for example, of a known polymer. The substrate layer E has a thickness of 100–200 $\mu$m and provides the adhesion between the layers D and F. The layer F consists of a permanent magnetic material having a high Curie temperature; this layer maintains an adequate magnetic field within the layer C of magnetic material in order to maintain any domains. Layer C has a thickness of 1–2 $\mu$ and contains preferred positions for the domains, for example, the shaded domain in position $C_2$. The preferred positions are spaced a few domain diameters apart. The domain diameter is, for example, 1 $\mu$m and the spacing is 4 $\mu$m. One bit information then requires a surface area of 16 $\mu m^2$. The preferred positions are formed by recesses in the form of shallow pits in the plate of magnetic material C. The recesses C1 . . . 4 change the magnetic energy of locally present domains such that the domains tend to be situated at the area of such a recess. The recesses are thus magnetically active. The active surface area of the disk of FIG. 2 is approximately 800 $cm^2$, so that it has a capacity in the order of $2 \times 10^9$ bits. The recesses can be provided after the plates of magnetic material have been provided on the disk of FIG. 2. The tracks can then be readily arranged about the disk center. The layer C is transparent in a given wavelength region. A reflective layer CF between the layers C and F enables detection of the domains by reflection. When a sequence of layers E-F-(CF)-C is provided on both sides, such a plate will be usable on both sides. A protective layer can also be provided on layer C.

Figure 4:
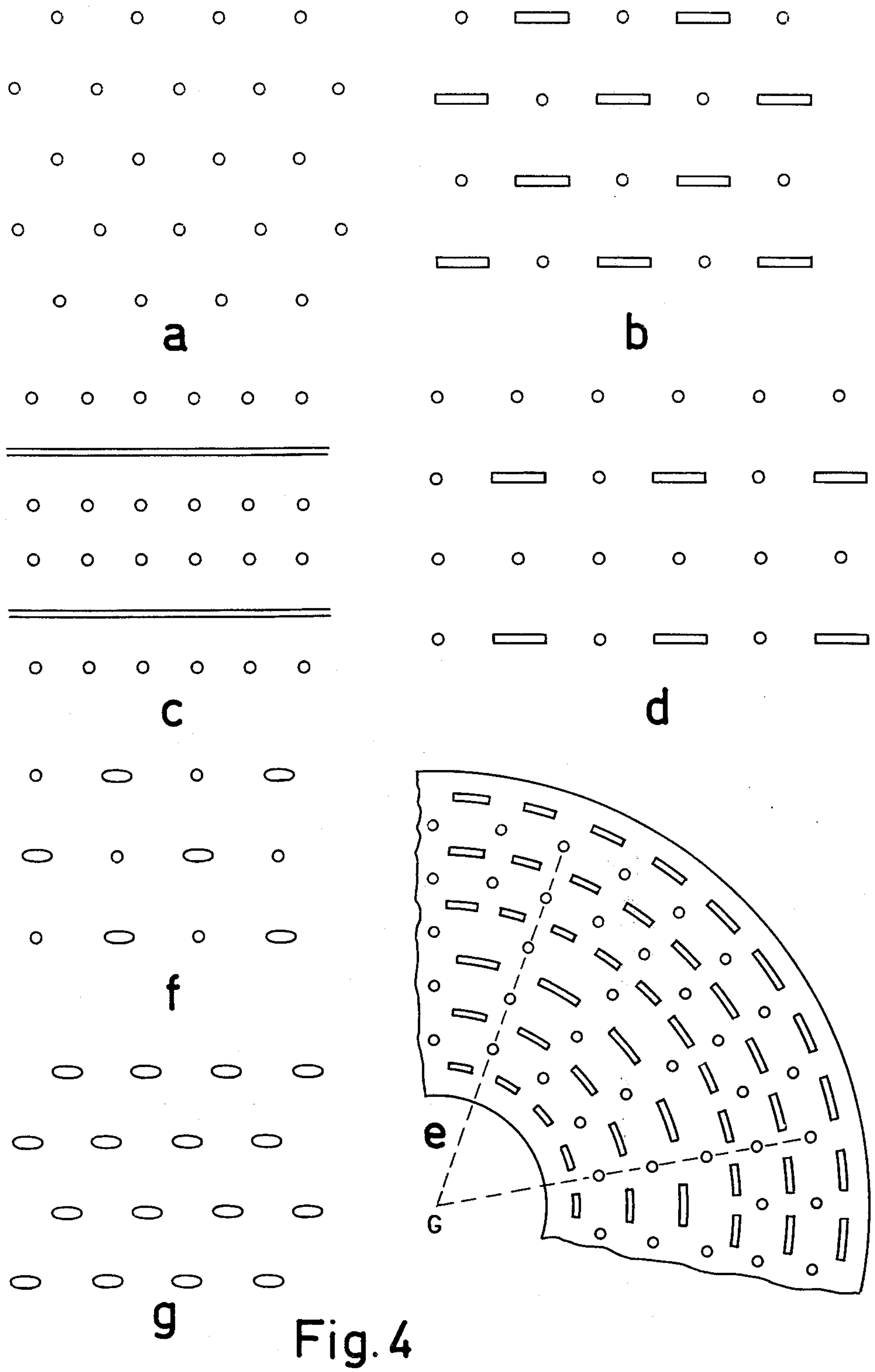
FIG. 4 shows examples of two-dimensional arrays of positions.

FIG. 4 shows examples of two-dimensional arrays of positions. The positions are denoted by circles.

First an hexagonal pattern of positions (a) is given for a disk having a very large radius, so that the curvature is negligibly small. This pattern produces the highest packing density. On a storage disk having a smaller radius, the rows of positions form circular tracks or one or more spiral-shaped tracks, the pitch of which is small with respect to the radius. Case *b* shows additional strip-like recesses which serve for the accurate positioning to be discussed hereinafter. The preferred positions and the additional recesses are alternately arranged on the same, in this case horizontal, tracks. Case *c* shows that there may be separate tracks in which the elongated recesses for the accurate positioning are situated. The elongated recesses can extend into each other such that a single groove is obtained. Case *d* shows that there may be tracks containing preferred positions and elongate additional recesses next to tracks containing only preferred positions. Case *f* shows that the elongated recesses are so short that a domain present therein is bounded to the relevant position as well as being positioned in a sufficiently reproducible manner so as to be detected in a fixed location. This fixed location is advantageous if synchronous detection takes place, for example, to improve the signal-to-noise rations. The recovery of the synchronization information is then effected by means of the domains stored on the dot-like recesses. Case *g* shows that the elongated recesses can serve for centering and domain storage without additional synchronization positions being necessary. Case *e* shows a sector of a storage disk as shown in FIG. 2. The preferred positions which are denoted by circles are situated on circular tracks. On the inner circles they are situated on a number of lines which extend from the center G and which each time enclose a fixed angle with each other. This angle is halved for the outer circles. The elongated recesses are situated on the intermediate tracks.

The foregoing can be extended yet in that analog or digital information (i.e. fixed information) is contained in the longitudinal dimension of the elongated recesses.

The patterns of FIG. 4 can be used for a rotating storage disk. On the other hand, if the plate of magnetic material is stationary and the beam of light source LASER scans the plate, for example, according to a line raster, analog patterns can serve for readjustment of the beam.

Figure 5:
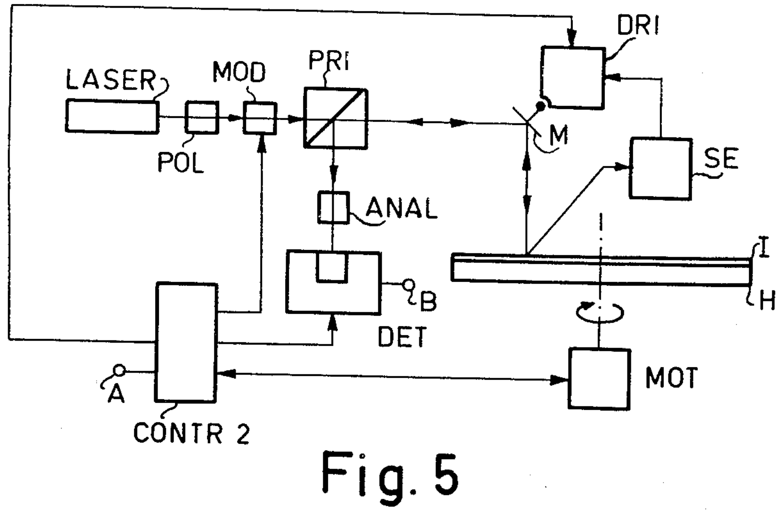
FIG. 5 shows another storage system according to the invention.

FIG. 5 shows another diagram of the storage system according to the invention, comprising a control unit CONTR 2, having a signal input A, a light source LASER, a polarizer POL, a modulator MOD, a prism PRI, an adjustable mirror M, an adjusting device DRI, a position-determining unit SE, a storage disk as shown in FIG. 2, comprising the layer I in which a domain can be formed and further layers H, a drive unit MOT, an analyzer ANAL, a detector DET, and a signal output terminal B. The light source LASER continuously radiates light which is polarized by the polarizer POL and which is modulated in intensity by the modulator MOD under the control of the control unit CONTR2. The polarized and modulated light reaches, via the prism PRI and the adjustable mirror M, the storage disk I/H, is subjected to Faraday rotation in the layer I in accordance with the presence or absence of a domain in the relevent location, is reflected on the interface of the layers I and H, and reaches the detector DET via the adjustable mirror M, the prism PRI which comprises a semitransparent reflective layer which is arranged according to the diagonal shown, and the analyzer ANAL. The storage disk is rotated at a substantially uniform speed by the drive unit MOT. The units MOT and CONTR2 form a control loop with the result that the modulation signals of the unit CONTR 2 to the modulator MOT correspond to the positions on the storage disc I/H in which domains are present. The adjusting unit DRI receives signals from the control unit CONTR2, with the result that it is adjusted to the correct track (FIG. 4): this is the coarse adjustment. The adjusting unit DRI furthermore receives signals from the position-determining unit SE, with the result that fine adjustment is possible. This adjustment can relate to the distance from the disk as well as to the fine adjustment to the correct track: a control loop is thus formed again. In the plate I/H the polarization plane of the light rotates in accordance with the presence of domains. The further operation of the device is analogous to that of the device described with reference to FIG. 1.

The operation of the storage system is analogous during the write procedure, with the exception of the analyzer ANAL and the detector DET. It is assumed that no domain is present. The light source LASER then brings a quantity of energy in a given position of the array of positions (FIG. 4). This quantity is larger than that during the read procedure. This can be realized, for example, by a lower rotary speed of the disk in conjunction with longer passage times of the modulator MOT, by means of a controllable attenuator arranged between the light source LASER and the prism PRI, or by means of an additional light source. If the temperature is raised to approximately or beyond the compensation point during heating, for example over some tens of degrees, domains can spontaneously appear on the illuminated locations during subsequent cooling. The materials which are suitable for the formation of domains usually comprise two magnetizable(crystal)sublattices; each of these lattices has its own Curie temperature above which the magnetization is lost: these Curie temperatures are often high, for example, approximately 200°C. The behavior of the magnetization of the sub-lattices can differ, and at a given temperature the magnetization of the two sub-lattices may be equal and opposed so that they cancel. Domains can then spontaneously appear. The compensation temperature may be lower, for example, 0°–50°C. By a suitable choice of materials, a volume of, for example, 10 $\mu m^3$ can be heated over 15°C per domain so as to generate the domain. The dimensions of the domains are only dependent, as previously described, of the external magnetic field and the material parameters. The required write energy, consequently, has a lower sound, but the upper limit is ample: as a result, the energy from the light source LASER need not be very constant. Using a light source of a few milliwatts, a sufficiently high write speed (bit rate) can thus already be obtained. When the temperature decreases below the compensation point, the domains remain bounded to the preferred positions or they move to the nearest preferred position (if they were not formed exactly in such a position). As a result, the write positioning may be less accurate. Finally, another advantage of compensation point writing is that the writing can be quickly effected as a result of the small quantity of energy required. Consequently, the effect of heat conductivity is negigibly small so that only a single domain position can be heated. As a result, the heating does not influence the information in neighbouring domain positions. Further advantages of reduced heating are: little thermal stresses, little diffusion of the atoms through the crystal lattice, little precipitation from unstable alloys.

It is alternatively possible to use a preheater (not shown) to a temperature just below the compensation temperature, the operation of the light source LASER being the same as during the read procedure. The preheater may be a high-frequency induction coil. Because the preferred positions do not contain materials having different properties (for example, higher electrical conductivity), the heat is specifically brought into the plate of magnetic material. A changeover from reading to writing and vice versa can thus be readily effected.

Another possibility is to counteract the bias field locally by the magnetic field which is generated by an additional winding. The magnetization energy is then smaller for both said sub-lattices, because a domain can be more readily created by means of the temperature increase provided by the light source LASER.

Domains can be rased in that they are annihilated (collapse field) by a local additional magnetic field in the same direction as the bias field. A temperature increase reduces the magnetization energy, so that the annihilation is facilitated. The additional temperature increase can again be realized by means of the light source LASER or an additional light source as already described. By proper adaptation, writing (introducing new domains) as well as erasing (annihilation of existing domains) can be effected by means of one additional magnetic coil. In the case of writing, the additional magnetic field must disappear before the increased temperature, while in the case of erasing it must disappear after the increased temperature. This can be effected by rotation reversal. By the selective erasing of domains, a write operation can also be performed, for example, if all said positions are occupied by a domain.

There are three methods of changing stored information:

a. radiation of light: high resolution can then be obtained in two directions so that each position can be separately addressed.

b. influencing the magnetic field; magnetic heads are known in which, as a result of a narrow gap, the head has high resolution in the direction transverse to the gap; this is usually lower in the longitudinal direction.

c. heating by means of an induction coil; in that case no high resolution will be achieved.

For the separate addressing of the bits, the radiation of light is most suitable, as described, possibly in combination with one of the other mechanisms. The other two methods are suitable for the simultaneous addressing of a number of bits for example, because a magnetic head is used with a gap in the direction of the relative movement with respect to the storage plate).

The heating source and the other methods can act on the same location, but it is alternatively possible to heat first and to apply the additional magnetic field later; in that case the relaxation time of the temperature distribution must be smaller than the transport time between the heating location and the magnetic head.

Figures 6A, 6B:
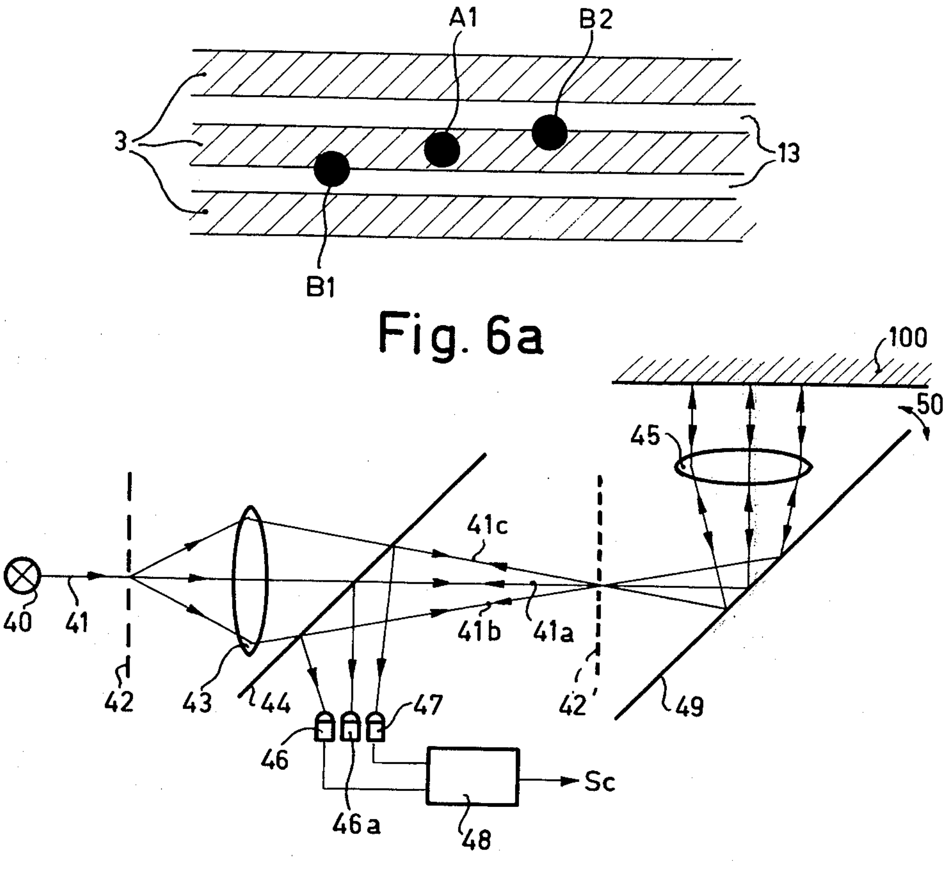
FIG. 6 shows a positioning unit.

FIGS. 6*a* and 6*b* show a device by means of which the detection unit can be centered on the correct track. It is assumed that the recesses in the plate of magnetic material are organized according to case *b* of FIG. 4. According to copending U.S. Patent application Ser. No. 345,644, filed Mar. 28, 1973 in the name of Applicant, the positioning device comprises a radiation source and a radiation-sensitive detection system for converting the radiation which is supplied by the radiation source and which is reflected by the record carrier into electrical signals, the radiation source supplying three beams for the formation of three radiation spots on the plane of a track part to be read, the dimensions of said radiation spots corresponding to the smallest detail of the optical structure, the positions being different, viewed transversely to the track, at least one radiation-sensitive detector being provided for each beam. By comparison of the electrical signals which are supplied by the detectors which are arranged in the beam paths of the outer beams, it can be established whether or not the center beam (the read beam) is properly directed with respect to the track. It is advantageous if the center of at least one of the outer beams, viewed in the width direction of the tracks, intersects the plane of the track part to be read at an acute angle; the position of this plane with respect to the radiation-sensitive detection system can then also be determined. Use is made of the fact that the position in which the center of an inclined beam intersects the track changes when this plane is displaced.

So as to enable reading, it must be ensured that the read beam images an area of the record carrier on the detector which is only as large as the smallest detail in the optical structure. It must also be ensured that the axis of the read beam always intersects the plane of the track in the centre of this track.

FIG. 6*a* shows how the position of the read beam can be detected with respect to the track. In addition to a light spot $A_1$, in the centre of a track 3, two light spots $B_1$ and $B_2$ are projected on the edge of the track. Spot $A_1$ is the section of the read beam at the area of the plane of the track. This spot is imaged on the high-frequency information detector. The distances between light spots $A_1$ and $B_1$ and between $A_1$ and $B_2$ are equal and constant. When $A_1$ is moved, $B_1$ and $B_2$ are moved in the same direction and over the same distance. When spot $A_1$ is situated in the center of a track 3, the two detectors on which the images $B_1$ and $B_2$ are imaged receive the same quantity of radiation. If the center of $A_1$ does not coincide with the center of the track to be read, the intensity of the radiation beam incident on these detectors is different. By comparison of the value of the electrical signal supplied by the detectors, the extent and the direction of a deviation between the read beam and the track to be read can be determined.

FIG. 6*b* shows how the three light spots can be formed on the record carrier 100. The beam 41 which is supplied by a pointed radiation source 40 is incident on a phase raster 42. This phase raster can be adapted such that the beams of an order higher than the first order are suppressed.

The phase raster 42 forms three deflection images of source 40 by way of the beams 41*a*, 41*b* and 41*c*, only one ray of said beams being shown. A lens 43 forms an image 42' of the raster in the focal plane of a lens 45. The parallel beams formed by the lens 45 are incident on record carrier 100 in different locations, viewed in the longitudinal direction of the track. So as to achieve that two light spots are projected on the edge of the track to be read, the raster lines, when projected in the plane of the track to be read, must enclose an acute angle with the direction of the track. The beams reflected by the record carrier are reflected to the detectors 46*a*, 46 and 47 by the semi-transparent mirror 44. In order to avoid moire effects, the raster 42 may not be passed twice. Therefore, this raster is arranged in front of the semi-transparent mirror 44.

Detector 46*a* is the high-frequency information detector, while detectors 46 and 47 are auxiliary detectors which are active in the determination of the position of the read beam with respect to the track to be read. The signals originating from the detectors 46 and 47 are applied to an electronic unit 48 in which a control signal $S_c$ is derived from these signals in known manner. By means of this control signal, the position of a tilting mirror 49 can be varied such that the light spot A is always projected on the desired part of the record carrier.

The above system was especially developed for a known storage plate in which the invariable information pattern is contained in the length of the elongate recesses: in that case all light is reflected on the upper surface. The detection of the domains is effected in the present case by means of light which is reflected on the lower side from the layer of magnetic material. The use of phase plates is known for the selective filtering of light which reflects on the upper or the lower side of the plate. It is alternatively possible to use a first wavelength of the light for the detection of domains, and to use light of a second wavelength for the positioning. The light spots of the second wavelength are then sharply imaged on the upper surface of the plate of magnetic material so that the reflection is substantially influenced by the presence of the recesses. The light of the first wavelength is imaged on the lower side of the plate of magnetic material, and is hardly influenced by the recesses.

Another possibility is to situate the two auxiliary beams such that they are incident on the positioning tracks of the cases *c* and *d* of FIG. 4. The spacing between the light spots is then much larger. In case *d*, 2 × 2 positioning light spots can then be present, i.e. one for the case that the positioning track is read and one for the case that the information track is read. Finally, a plurality of read beams can be active in parallel on adjacent tracks.

The addressing of a given track can furthermore be effected in that the control unit CONTR2 of FIG. 5 receives information from the position-determining unit SE, for example, information originating from the light reflected by the positioning tracks. When a positioning track is passed, the quantity of light reflected thereby decreases, which can produce the addressed track number when use is made of a detector and a counter. A predetermined track can thus be addressed.

What is claimed is:

1. A storage system comprising a plate of magnetic material, said magnetic material being provided with a regular two-dimensional array of first recesses, said first recesses forming in cooperation with said magnetic material magnetically active elements for storing digital information in the form of magnetic bubbles, write means comprising an electromagnetic radiation source for locally heating the magnetically active elements whereby the magnetic bubbles are formed, means for maintaining a magnetic bias field in the vicinity of said magnetically active elements, the magnitude of the field determining the bubbles dimensions, electromagnetic read means for detecting said bubbles, addressing means for directing said read means and the said read write means to scan a selected magnetically active area, said plate being further provided with second recesses elongated in the direction in which said magnetically active areas are scanned, said second recesses forming a regular two-dimensional array with said first recesses, and optical centering means for directing electromagnetic radiation to said second recesses and for centering said plate with respect to said read means and said write means in response to said radiation from said second recesses.

2. A storage system as claimed in claim 1, wherein said plate comprises a disc, further comprising drive means for rotating said disc at a substantially uniform speed, the first and second recesses being arranged according to at least substantially circular tracks.

3. A storage system as claimed in claim 1, wherein additional information is contained in a dimension of the second recesses.

4. A storage system as claimed in claim 1, wherein said means for maintaining a magnetic bias field comprises a layer of permanent magnetic material which is provided on the plate of magnetic material.

5. A storage system comprising a plate of magnetic material, said magnetic material being provided with a regular two-dimensional array of recesses, said recesses forming in cooperation with said magnetic material magnetically active elements for storing digital information in the form of magnetic bubbles, write means comprising an electromagnetic radiation source for locally heating the magnetically active elements whereby the magnetic bubbles are formed, means for maintaining a magnetic bias field in the vicinity of said magnetically active elements, the magnitude of the field determining the bubbles dimensions, electromagnetic read means for detecting said bubbles, addressing means for directing said read means and said write means to scan a selected magnetically active area, said recesses being elongated in the direction in which said magnetically active areas are scanned, and optical scanning means for directing electromagnetic radiation to said recesses and for centering the plate with respect to said read means and said write means in response to said radiation from said recesses.

* * * * *